United States Patent [19]
Arnold et al.

[11] 3,887,555
[45] June 3, 1975

[54] TETRATOSYLATE OR TETRAAMINO PHENYLATED QUINOXALINE MONOMERS AND METHOD OF SYNTHESIS

[75] Inventors: Fred R. Arnold, Centerville; Robert F. Kovar, Dayton, both of Ohio

[73] Assignee: The United States of America as represented by the Secretary of the Air Force, Washington, D.C.

[22] Filed: Mar. 26, 1973

[21] Appl. No.: 344,787

Related U.S. Application Data

[62] Division of Ser. No. 292,368, Sept. 26, 1972, Pat. No. 3,740,374.

[52] U.S. Cl. .................. 260/250 Q; 260/570.5 P
[51] Int. Cl............................................ C07d 51/78
[58] Field of Search .............................. 260/250 Q

[56]      References Cited
         UNITED STATES PATENTS
3,326,915   6/1967   Jackson et al. ............... 260/250 Q
3,637,692   1/1972   Culbertson.................... 260/250 Q
3,661,850   5/1972   Stille............................ 260/250 Q

OTHER PUBLICATIONS

Simpson, "The Chemistry of Heterocyclic Compounds," (1953), pg. 203–206, 225.

Ruggli et al., "Helo Chim Acta," 21, 1084, (1938) QD 1 H 4.

Morrison and Boyd, "Organic Chemistry," 1968, pg. 707.

*Primary Examiner*—Donald G. Daus
*Assistant Examiner*—David E. Wheeler
*Attorney, Agent, or Firm*—Cedric H. Kuhn

[57]         ABSTRACT

Thermally stable poly(quinoxalinobisimidazonaphthaldimide) materials are disclosed that are prepared by the condensation of multifunctional aromatic carboxylic acids or derivatives thereof and tetraamino phenylated quinoxaline compounds. The high thermal stability of the polymers and their solubility in a variety of organic solvents renders them particularly suitable for use in high temperature applications such as in the fabrication of plastic composites and protective coatings.

4 Claims, 2 Drawing Figures

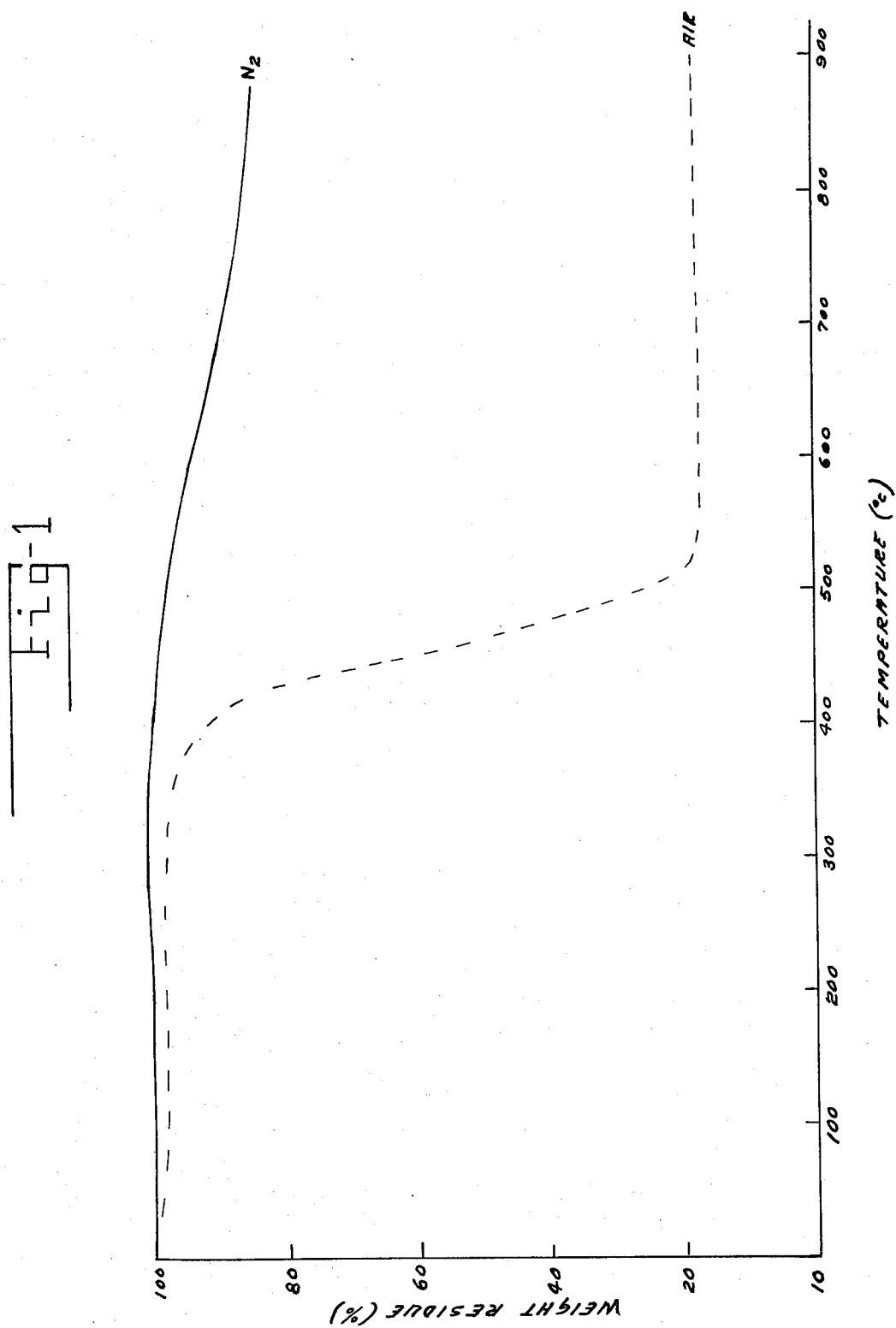

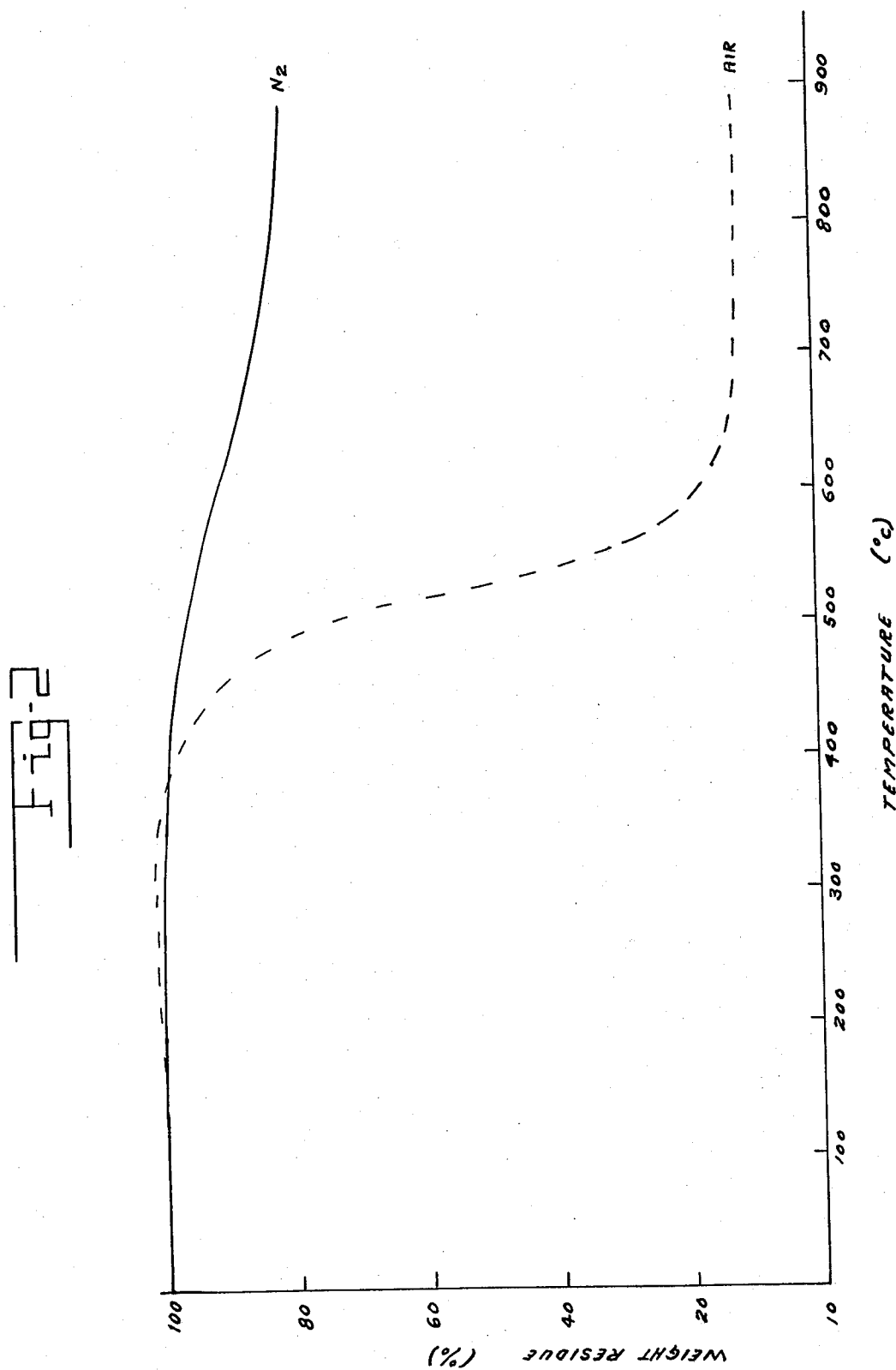

3,887,555

TETRATOSYLATE OR TETRAAMINO PHENYLATED QUINOXALINE MONOMERS AND METHOD OF SYNTHESIS

RIGHTS OF THE GOVERNMENT

The invention described herein may be manufactured and used by or for the Government of the United States for all governmental purposes without the payment of any royalty.

This is a division, of application Ser. No. 292,368, filed Sept. 26, 1972 and now issued as U.S. Pat. No. 3,740,374.

FIELD OF THE INVENTION

This invention relates to polymeric materials which have a high thermal stability. In one aspect it relates to a method for synthesizing the polymeric materials. In another aspect it relates to novel intermediates used in preparing monomers and methods for their preparation.

BACKGROUND OF THE INVENTION

In U.S. Pat. No. 3,546,181 issued to Fred E. Arnold, a coinventor of the present invention, polymers are disclosed that are prepared by the polycondensation of aromatic tetraacids with 2,3,11,12-tetraaminodiquinoxal-(2,3-4,2'-3'-1)pyrene. The polymers, which may be of the ladder type, possess a high degree of thermal stability. However, they are difficult to use in many applications because they are substantially insoluble in common solvents so that an acid, such as sulfuric acid, must be used in forming solutions of the polymers. G. Rabilloud et al in U.S. Pat. No. 3,635,892 disclose thermostable heterocyclic polymers that are prepared by reacting an aromatic tetraamine with a bis-glyoxilic arylene compound. However, as stated in the patent, the polymers are infusible, insoluble and difficult to employ for any practical purpose. Thus, it is necessary to separate a prepolymer from the reaction mixture, which after shaping is converted to the polymer of the invention.

It is an object of this invention, therefore, to provide thermally stable polymeric compositions that are soluble in common aprotic solvents.

Another object of the invention is to provide a method for synthesizing the polymeric materials of high thermal stability.

A further object of the invention is to provide polymers that will not deteriorate when exposed in an inert atmosphere to temperatures of the order of 500°C and higher.

Still another object of the invention is to provide intermediates for use in preparing the heat resistant polymer compositions.

Other objects and advantages of the invention will become apparent to those skilled in the art upon consideration of the ensuing disclosure and FIGS. 1 and 2 of the drawing that show graphs of data demonstrating the thermal stability of the polymer compositions.

SUMMARY OF THE INVENTION

The present invention resides in a thermally stable polymer which consists essentially of repeating units having the following formula:

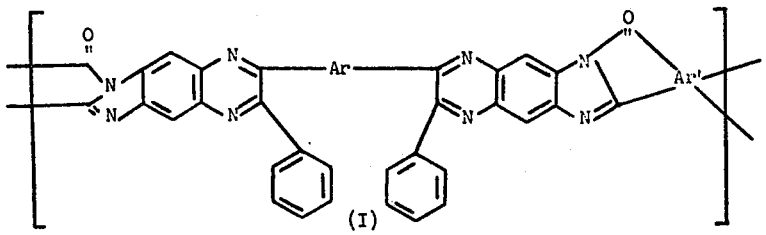

wherein Ar is one of the following radicals:

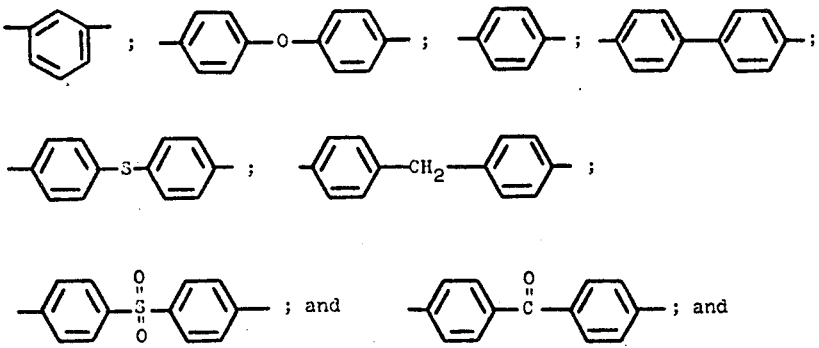

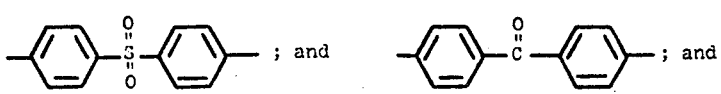

and Ar' is a tetravalent aromatic radical. The following are examples of tetravalent aromatic radicals:

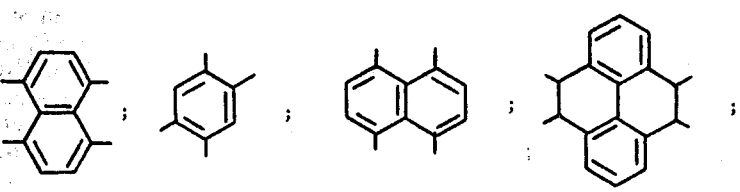

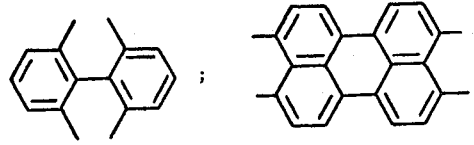 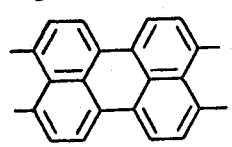 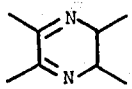

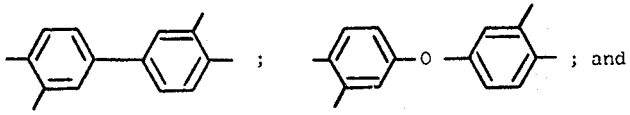 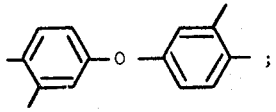 ; and

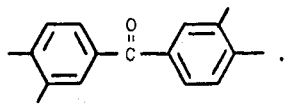

Of the polymers containing the aforementioned recurring units, those in which Ar is 1,3-phenyl or 4,4-diphenyloxide and Ar' is 1,4,5,8-naphthalene are preferred. There are generally at least two and preferably at least four of the recurring units in the polymer. In general, the number of recurring units is such that the polymer has an inherent viscosity of 0.35 to 0.50 dl/g in m-cresol.

In one embodiment, the present invention resides in a method for preparing the phenylated heterocyclic aromatic polymers. Thus, the polymers are synthesized by the condensation of tetrafunctional aromatic carboxylic acids or their corresponding anhydrides and tetraamino quinoxaline compounds. The condensation reaction involved is illustrated by the following equation.

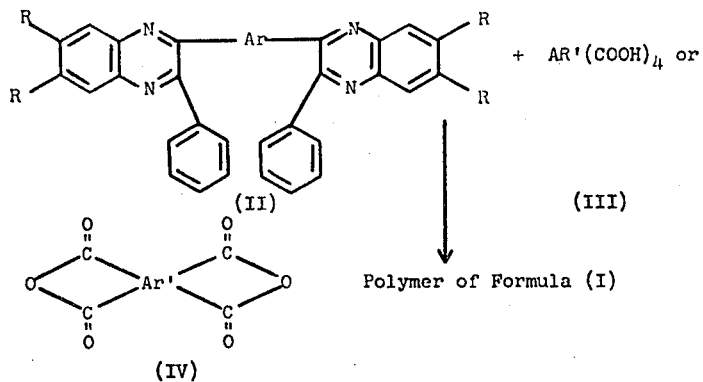

In the above equation, Ar and Ar' are as indicated hereinabove while R is TosNH or $NH_2$. The expression "Tos" designates the toluene sulfonamide derivative of the indicated tetraamino compounds. When R is TosNH, the compounds can be referred to as the 1,2-ditosylate of the tetraamino compounds.

The particular monomer corresponding to formula II used in the condensation reaction depends upon whether an aromatic tetracarboxylic acid (formula III) or a dianhydride of an aromatic tetracarboxylic acid (formula IV) is employed. Also, depending upon the selected reactants, polyphosphoric acid or an aprotic solvent is used as the reaction medium. Examples of suitable aprotic solvents include m-cresol, dimethyl formamide, dimethyl acetamide, hexamethyl phosphoramide, tetramethyl urea, dimethyl sulfoxide, and the like. Of the aprotic solvents, it is preferred to utilize m-cresol.

When the monomer used corresponds to formula II, i.e., R is TosNH or $NH_2$, it is reacted with the aromatic tetracarboxylic acid, i.e., compounds corresponding to formula III, employing polyphosphoric acid as the reaction medium. Examples of suitable carboxylic acids that can be used include 1,2,4,5-benzenetetracarboxylic acid; 1,2,6,7-pyrenetetracarboxylic acid; o,o,o',o'-diphenyltetracarboxylic acid; 1,2,5,6-naphthalenetetracarboxylic acid; 3,4,9,10-perylenetetraacid; pyrazinetetraacid; 3,4,3',4',-diphenyltetraacid; 3,4,3',4'-diphenyloxidetetraacid; 3,4,3',4'-diphenylketonetetraacid; and the like. However, it is often preferred to utilize 1,4,5,8-naphthalenetetracarboxylic acid. The condensation reaction is conducted in an inert atmosphere at a temperature ranging from about 100° to 225°C for a period of about 1 to 18 hours. Examples of gases that can be employed to provide an inert atmosphere include nitrogen, helium, argon, and the like.

When a dianhydride of an aromatic tetracarboxylic acid, i.e., compounds corresponding to formula IV, is used in the method, it is reacted in an inert atmosphere with a monomer corresponding to formula II in which R is $NH_2$. The corresponding dianhydrides of the aromatic tetracarboxylic acid mentioned above are examples of compounds of formula IV that can be used. The condensation reaction is usually conducted at a temperature ranging from about room temperature to 190°C, using an aprotic solvent as the reaction medium. Examples of suitable aprotic solvents have been mentioned hereinabove. It is generally preferred to carry out the reaction in m-cresol under reflux conditions. The reaction period can vary within rather wide limits, for example, from about 1 to 18 hours.

In the preparation of the polymers of this invention as described above, the reactants are generally employed in equimolar amounts. While a small excess of one of the reactants is not detrimental to the condensation reaction, a considerable excess of one of the reactants results in the production of lower molecular weight products.

In recovering the polymer product, the reaction mixture is cooled, if necessary, at the end of the reaction period, e.g., to a temperature ranging from about 80° to 110°C. The mixture is then poured into an anhydrous alcohol, such as methanol, thereby causing the polymer to precipitate from solution. After recovery of the polymer, as by filtration or decantation, it is then washed with methanol followed by a water wash. It is often desirable to repeat the washing operation several times in order to ensure removal of foreign materials. Upon completion of the washing procedure, the polymer is air dried and then dissolved in an aprotic solvent, preferably m-cresol. Thereafter, the solution is added to anhydrous methanol so as to precipitate the polymer from solution. After separation of the precipitated polymer, it is dried under a vacuum, thereby yielding a purified polymer product. It is to be understood that modifications in the recovery procedure can be followed without departing from the spirit and scope of the invention. For example, the precipitation of the polymer from solution in m-cresol can be repeated one or more times in order to further purify the polymer.

The aromatic tetracarboxylic acids and their corresponding dianhydrides are well known compounds that are described in the literature. However, the phenylated quinoxaline tetraamines and the tetratosylates thereof, used as monomers in synthesizing the polymers of this invention, are new compounds. A description of a method for preparing these compounds is set forth hereinafter.

In general, the tetratosylate monomers are prepared by the condensation of 1,2-diamino-4,5-(p-toluenesulfamido)benzene with a variety of different dibenzils. Detosylation of these compounds by treatment with sulfuric acid followed by neutralization with a basic reagent provides the free amines. The reactions involved in preparing the monomers are represented by the following equations.

In the foregoing formulae, Ar is as defined hereinbefore.

The compound of formula V, namely, 1,2-diamino-4,5-(p-toluenesulfonamide)benzene, is reacted with the aromatic dibenzil of formula VI in an aprotic solvent as the reaction medium. m-Cresol is the preferred solvent, but examples of others that can be used have been mentioned hereinabove. Examples of suitable aromatic dibenzils that can be employed include 1,3-(phenylglyoxaloyl)benzene; p,p'-(phenylglyoxaloyl)diphenylether; p,p'-(phenylglyoxaloyl)benzene; p,p'-(phenylglyoxaloyl)diphenylsulfide; p,p'(phenylglyoxaloyl)biphenyl; p,p'(phenylglyoxaloyl)diphenylmethylene; p,p'(phenylglyoxaloyl)diphenylsulfone; and p,p'(phenylglyoxaloyl)benzophenone. The reaction is usually carried out at a temperature ranging from about room temperature to 200°C for a period of about 1 to 6 hours. Upon completion of the reaction, the product is conveniently recovered by adding the reaction mixture to water, thereby precipitating the compound as a pale yellow solid. After washing the solid material several times with water, it is then washed with methanol and finally air dried.

Examples of monomers of formula VII that can be prepared by the above-described procedure include 1,3-bis[2-phenyl-6,7-(p-toluenesulfonamido)quinoxaline]-3-yl-benzene; p,p'[2-phenyl-6,7-(p-toluenesulfonamido)quinoxaline]-3-yl-diphenylether; p,p'-bis[2-phenyl-6,7-(p-toluenesulfonamido)quinoxaline]3-yl-benzene; p,p'[2-phenyl-6,7-(p-toluenesulfonamido)quinoxaline]-3-yl-diphenylsulfide; p,p'[2-phenyl-6,7-(p-toluenesulfonamido)quinoxaline]-3-yl-biphenyl; p,p'[2-phenyl-6,7-(p-toluenesulfonamido)quinoxaline]-3-yl-diphenylmethylene; p,p'[2-phenyl-6,7-(p-toluenesulfonamido)quinoxaline]-3-yl-diphenylsulfone; and p,p'[2-phenyl-6,7-(p-toluenesulfonamido)-quinoxaline]-3-yl-benzophenone.

The tetraamine compounds of formula VIII, also used as monomers in the condensation reaction, are prepared by addition of the tetratosylates under an inert gas to a concentrated sulfuric acid solution. The reaction that occurs is allowed to proceed at a temperature ranging from about zero to 150°C for a period of about 1 to 12 hours. At the end of the reaction period,

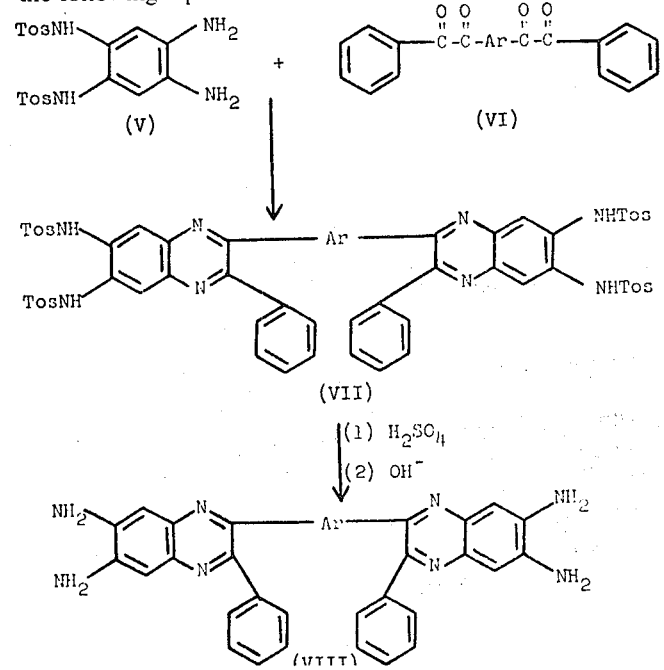

the reaction mixture is cooled, if necessary, so as to precipitate a solid tetraamine salt. After recovery of this material as by filtration, it is washed with water and then air dried. The dried tetraamine salt is then neutralized by contacting it with a base, e.g., by dissolving it in a solution of potassium hydroxide in methanol. After filtration of the solution, it is poured into hot water and the resulting suspension is heated to evaporate the methanol. The tetraamine product is then recovered, as by filtration, washed with water and air dried. It is to be understood that any base can be employed, such as sodium hydroxide, ammonium carbonate, and the like.

Examples of tetraamine monomers of formula VIII include 1,3(2-phenyl-6,7-diamino-quinoxaline)-3-yl-benzene; p,p'(2-phenyl-6,7-diamino-quinoxaline)-3-yl-diphenylether; p,p'(2-phenyl-6,7-diamino-quinoxaline)-yl-benzene; p,p'(2-phenyl-6,7-diamino-quinoxaline)-3-yl-diphenylsulfide; p,p'(2-phenyl-6,7-diamino-quinoxaline)-3-yl-biphenyl; p,p'(2-phenyl-6,7-diamino-quinoxaline)-diphenylmethylene; p,p'(2-phenyl-6,7-diamino-quinoxaline)-3-yl-diphenylsulfone; and p,p'-(2-phenyl-6,7-diamino-quinoxaline)-3-yl-benzophenone.

The tetraamines of formula VIII can also be prepared by reacting 1,2-dinitro-4,5-diaminobenzene with the aromatic dibenzils of formula VI. The reaction is preferably conducted under an inert atmosphere in glacial acetic acid. The materials are usually reacted under reflux conditions for a period of about 1 to 6 hours although lower temperatures can be used. Upon cooling the reaction mixture to room temperature, crystals of 1,3-(2-phenyl-6,7-dinitroguinoxaline)-3-yl-benzene precipitate from solution. After purifying the crystals, they are added to a suspension of granular tin in concentrated hydrochloric acid. The resulting mixture is then heated at about 50° to 100°C for a period of about 1 to 6 hours, thereby forming an amine salt precipitate. After washing the amine salt with hydrochloric acid, it is dissolved in methanol and the resulting solution is poured into an aqueous sodium hydroxide solution. There is thus formed a precipitate of the free tetraamine of formula VIII.

A more complete understanding of the invention can be obtained by referring to the following illustrative examples which are not intended, however, to be unduly limitative of the invention.

EXAMPLE I

Preparation of 1,2-Diamino-4,5-(p-toluenesulfonamide)benzene

To a solution of 30.4 g (60 mmole) of 1,2-dinitro-4,5-o-phenylene-bis(p-toluenesulfonamide) in 150 ml of dimethylacetamide at 95°C was added dropwise an aqueous solution containing 62.6 g (360 mmole) of sodium hydrosulfite and 14.4 g (360 mmole) of sodium hydroxide. After the addition was completed, the reaction mixture was added to 1 liter of water to precipitate the product as a white solid. The solid material was collected, washed with several portions of water, then washed with methanol and air dried, yielding 20 g (74 percent) of 1,2-diamino-4,5-o-phenylene-bis(p-toluenesulfonamide) (m.p. 238°–9°C).

EXAMPLE II

Preparation of 1,3-[2-phenyl-6,7-(p-toluenesulfonamido)quinoxaline]-3-yl-benzene A mixture of 30.8 g (68.8 mmole) of 1,2-diamino-4,5-(p-toluenesulfonamide)benzene and 11.9 g (34.4 mmole) of 1,3-(phenylglyoxaloyl)benzene in 100 ml of m-cresol was heated at reflux under nitrogen for 3 hours. The reaction mixture was then evaporated to dryness in vacuo, and the tarry residue triturated with hexane causing solidification of the product. The pink solid thus obtained was twice recrystallized from a mixture of methanol and methylene chloride, yielding 37 g (93 percent) of orange powder (m.p. 275°C).

Analysis
Calcd. for $C_{62}H_{50}N_{8}O_{8}S_{4}$: C,64.01; H,4.33; N, 9.63
Found: C,63.54; H,4.79; N,9.20

EXAMPLE III

Preparation of 1,3-(2-phenyl-6,7-diamino-quinoxaline)-3-yl-benzene

To 100 ml of de-aerated concentrated sulfuric acid was added under nitrogen 20 g (17.2 mmole) of finely powdered 1,3-[2-phenyl-6,7-bis(p-toluenesulfonamido)quinoxaline]-3-yl-benzene. The stirred mixture was heated at 90°C under nitrogen for 1 hour, at which time it was cooled to 0°C and poured over ice, precipitating an orange solid. The solid tetramine salt was collected, washed with water and air dried. The solid material was then dissolved in 10 percent solution of potassium hydroxide in methanol and the filtered solution poured into a large volume of hot water. The resulting yellow suspension was heated in a steam bath until all of the methanol had evaporated, leaving a yellow precipitate of 1,3-(2-phenyl-6,7-diamino-quinoxaline)-3-yl-benzene. The product was collected, washed with water and dried. Chromatography of the material on a dry column of alumina afforded a pure product (m.p. 400°C). The material sublimed with decomposition at 400°C and 0.01 mm Hg.

Analysis Calcd. for $C_{34}H_{28}N_{8}$: C,74.71; H,4.79; N,20.50
Found: C,74.14; H,4.34; N,19.82

EXAMPLE IV

Preparation of p,p'-[2-phenyl-6,7-bis(p-toluenesulfonamido)quinoxaline]-3-yl-diphenylether A mixture of 10.0 g (11.2 mmole) of 1,2-diamino-4,5-o-phenylene-bis(toluenesulfonamide) and 5.0 g (5.6 mmole) of p,p'-phenylglyoxaloyl)diphenylether in 50 ml of m-cresol was heated at reflux under nitrogen for 3 hours. The reaction mixture was then evaporated to dryness in vacuo, and the tarry residue triturated with hexane until solidification of the product occurred. The pink solid thus obtained was twice recrystallized from a mixture of methanol and methylene chloride, yielding an orange powder.

| Analysis | |
|---|---|
| Calcd. for $C_{68}H_{54}N_8O_9S_4$: | C,65.06; H,4.34; N,8.93 |
| Found: | C,64.68; H,4.52; N,8.71 |

EXAMPLE V
Preparation of p,p'-(2-phenyl-6,7-diamino-quinoxaline)-3-yl-diphenylether To 50 ml of de-aerated concentrated sulfuric acid was added under nitrogen 15.0 g (24 mmole) of finely powdered p,p'-[2-phenyl-6,7-bis(p-toluenesulfonamido)quinoxaline]-3-yl-phenylether. The stirred mixture was heated at 90°C under nitrogen for 1 hour, at which time it was cooled to 0°C and poured over ice, precipitating an orange solid. The solid tetraamine salt was collected, washed with water and air dried. The solid material was then dissolved in 10 percent solution of potassium hydroxide in methanol, and the filtered solution poured into a large volume of hot water. The resulting yellow suspension of tetraamine was heated in a steam bath until all of the methanol had evaporated. The product was collected, washed with water and air dried. Chromatography of the material on a dry column of activity grade II alumina afforded pure p,p'-[2-phenyl-6,7-diaminoquinoxaline]-3-yl-diphenylether as yellow crystals.

| | |
|---|---|
| Analysis Calcd. for $C_{40}H_{30}N_8O$: | C,77.15; H,4.86; N,17.99 |
| Found: | C,76.64; H,4.78; N,17.22 |

EXAMPLE VI
Preparation of 1,3-(2-phenyl-6,7-dinitroquinoxaline)-3-yl-benzene To a solution of 12.0 g (60.6 mmole) of 1,2-dinitro-4,5-diaminobenzene in 100 ml of glacial acetic acid was added 10.2 g (30 mmole) of 1,3-bis-phenylglyoxaloyl)benzene, and the reaction mixture refluxed for one hour under nitrogen. The yellow solution was allowed to cool to room temperature, and the yellow crystals which precipitated were filtered by suction and washed with a small quantity of tetrahydrofuran. Recrystallization of the product from a mixture of dimethylacetamide and hexane afforded granular yellow crystals of 1,3-(2-phenyl-6,7-dinitroquinoxaline)-3-6l-benzene benzene (m.p. 340°C).

| Analysis | |
|---|---|
| Calcd. for $C_{34}H_{18}N_8O_8$: | C,61.27; H,2.72; N,16.81; M.W. = 666.57 |
| Found: | C,60.97; H,2.61; N,16.46; M.W. = 666 (mass spectrum) |

EXAMPLE VII
Preparation of 1,3-(2-phenyl-6,7-diaminoquinoxaline)-3-6l-benzene benzene by Reduction of the Product of Example VI To a suspension of 50 g of granular tin in 100 ml of concentrated hydrochloric acid was added 15 g (22.5 mmole) of the product of Example VI. The resulting mixture was heated in a steam bath with stirring for two hours, at which time a dark purple precipitate had formed. The purple precipitate of tetraamine-tetrahydrochloride was carefully decanted from the reaction flask onto a buchner funnel, rinsing the flask with additional HCl. The amine salt was washed with several small portions of concentrated HCl, dried, and then dissolved in a minimum amount of methanol. The methanol extracts were filtered, and then poured into a large volume of 5 percent aqueous sodium hydroxide solution, forming a bright yellow precipitate of the free tetraamine. Purification of the tetraamine by column chromatography on alumina followed by two successive recrystallizations from a mixture of methanol and water afforded 9.5 g (79 percent) of pure product as yellow crystals (m.p. 400°C). The infrared spectrum obtained for the product prepared by this method was identical with the product of Example III that was synthesized by the detosylation of the product of Example II.

| Analysis | |
|---|---|
| Calcd. for $C_{34}H_{26}N_8$: | C,74.71; H,4.79; N,20.50; M.W. = 546.6 |
| Found: | C,74.22; H,4.53; N,19.72; M.W. (mass spectrum) = 547 |

EXAMPLE VIII
Polymerization of Compound of Example II with NTCA in Polyphosphoric Acid To 60 g of deoxygenated polyphosphoric acid was added, under a nitrogen atmosphere, 0.3445 g (1.1325 mmole) of 1,4,5,8-naphthalene tetracarboxylic acid (NTCA) and 1.3176 g (1.1325 mmole) of 1,3,-[2-phenyl-6,7-bis(p-toluenesulfonamido)quinoxaline]-3-yl-benzene. The reaction flask was slowly heated to 180°C and was maintained at that temperature for 20 hours. At that time, the contents of the flask were cooled to 100°C, and poured into 1 liter of anhydrous methanol, precipitating a dark red polymer. The product was collected, washed with several portions of methanol, then water, and air dried. The crude polymer was dissolved in 50 ml of m-cresol and water, and the filtered solution was slowly added to 1 liter of anhydrous methanol. The precipitate that formed was collected, washed with several portions of methanol, and dried in vacuo. The purified polymer thus obtained exhibited an intrinsic viscosity of 0.45 dl/gm in m-cresol, and 0.65 dl/gm in concentrated sulfuric acid.

| Analysis Calcd. for $C_{48}H_{22}N_8O_2$: | C,77.62; H,2.99; N,15.09 |
|---|---|
| Found: | C,76.79; H,2.87; N,14.53 |

EXAMPLE IX
Polymerization of Tetraamine of Example III in Polyphosphoric Acid To 20 g of deoxygenated polyphosphoric acid was added, under a nitrogen atmosphere, 0.1667 g (0.548 mmole) of 1,4,5,8-naphthalene tetracarboxylic acid and 0.3000 g (0.548 mmole) of 1,3-(2-phenyl-6,7-diamino-quinoxaline)-3-yl-benzene. The reaction flask was slowly heated to 180°C, and was maintained at that temperature for 10 hours. At that time, the contents of the flask were cooled to 100°C, and poured into 1 liter of anhydrous methanol, precipitating a dark red polymer. The product, after reprecipitation from a m-cresol solution by pouring the solution into methanol, and subsequent drying in vacuo, exhibited an inherent viscosity of 0.42 dl/gm in m-cresol, and 0.61 dl/gm in concentrated sulfuric acid. The infrared spectrum was identical to that obtained for the polymer synthesized from the reaction of NTCA with the tetratosylate.

| Analysis Calcd. for $C_{48}H_{22}N_8O_2$: | C,77.62; H,2.99; N,15.09 |
|---|---|
| Found: | C,76.82; H,3.01; N,14.21 |

EXAMPLE X

Polymerization of Tetraamine of Example III with NTCADA in m-cresol

To 20 g of deoxygenated m-cresol was added, under a nitrogen atmosphere, 0.1470 g (0.548 mmole) 1,4,5,8,-naphthalene tetracarboxylic acid dianhydride (NTCADA), and 0.3000 g (0.548 mmole) of 1,3-(2-phenyl-6,7-diamino-quinoxaline)-3-yl-benzene. The reaction flask was slowly heated to reflux temperature (190°C), and was maintained at that temperature for 10 hours. At that time, the contents of the flask were cooled to 100°C and added dropwise to 1 liter of methanol, precipitating a red polymer. The product, after reprecipitation by pouring a solution of the polymer in m-cresol into methanol, and subsequent drying in vacuo, exhibited an inherent viscosity of 0.46 dl/gm in m-cresol (0.3 g/l). The infrared spectrum was identical to that obtained previously for the polymer derived from NTCA and the tetratosylate in polyphosphoric acid solution.

| Analysis Calcd. for $C_{48}H_{22}N_8O_8$: | C,77.62; H,2.99; N,15.09 |
|---|---|
| Found: | C,76.88; H,2.67; N,14.54 |

EXAMPLE XI

Polymerization of Tetratosylate of Example V with NTCA

A mixture of 0.3146 g (1.034 mmole) of 1,4,5,8-naphthalene tetracarboxylic acid and 1.300 g (1.034 mmole) of p,p'-[2-phenyl-6,7-bis(p-toluenesulfonamido)-quinoxaline]-3-yl-diphenylether was polymerized in a polyphosphoric acid solution according to the procedure described previously in Example VIII. Workup of the reaction mixture in the usual manner afforded 0.81 g of purified polymer. The polymer, exhibited an inherent viscosity of 0.66 dl/g in concentrated sulfuric acid (0.3 g/100g $H_2SO_4$).

| Analysis Calcd. for $C_{54}H_{26}N_8O_3$: | C,77.69; H,3.14; N,13.42 |
|---|---|
| Found: | C,75.96; H,3.52; N,14.62 |

The polymers of Examples IX and XI were subjected to thermogravimetric analysis, and the data obtained are shown graphically in FIGS. I and II, respectively. As seen from FIG. 1, the polymer of Example IX underwent a weight loss of 10 percent at 700°C in nitrogen and 410°C in air. From FIG. 2, it is seen that the polymer of Example XI lost 10 percent of its weight at 610°C in nitrogen and the same amount at 460°C in air.

The data in the foregoing examples demonstrate that the polymers of this invention are soluble in an aprotic solvent, such as m-cresol. Furthermore, thermogravimetric analyses of the polymer show that they are thermally stable at elevated temperatures. These desirable properties render them especially useful for high temperature applications and facilitate the fabrication of composites and the preparation of protective coatings.

As will be evident to those skilled in the art, modifications of the present invention can be made in view of the foregoing disclosure. Such modifications fall within the spirit and scope of the invention.

We claim:

1. A compound having the following formula:

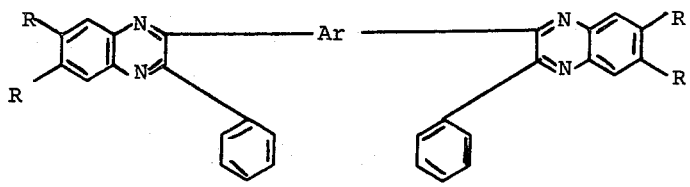

wherein R is $NH_2$ or TosNH and Ar is one of the following radicals:

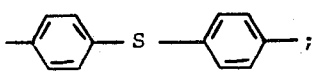 ; 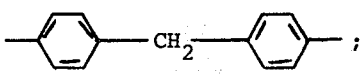 ;

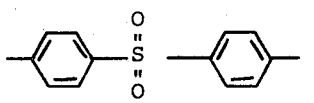 and 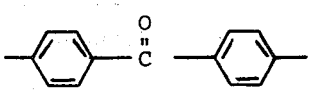 .

2. The compound of claim 1 in which R is NH$_2$.
3. The compound of claim 1 in which R is TosNH.
4. A method for preparing a compound having the following formula:
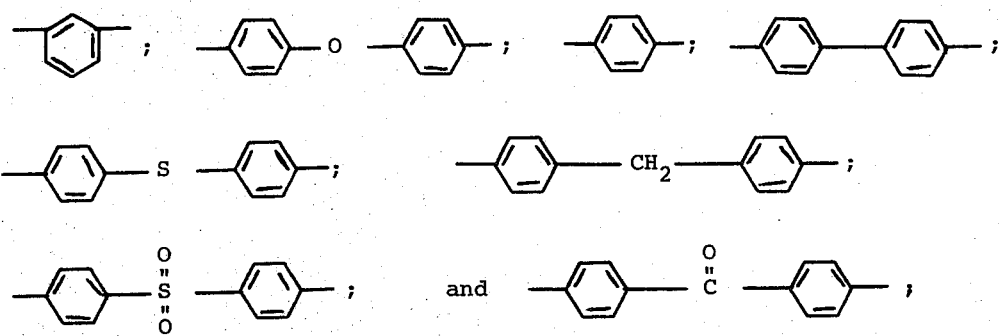
wherein Ar is one of the following radicals:
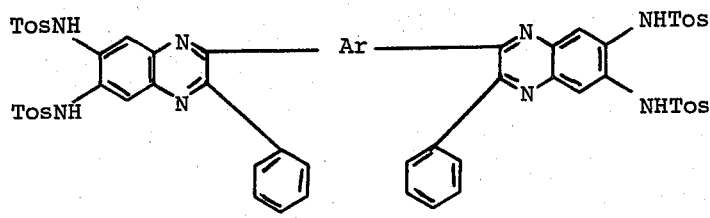
said method comprising the step of reacting 1,2-diamino-4,5-(p-toluenesulfamido)benzene with a compound having the following formula:
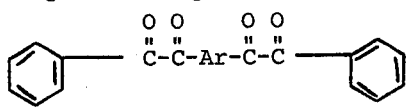
wherein Ar is as indicated hereinabove.
* * * * *